Oct. 10, 1967   C. VAN DER LELY   3,345,808
HARVESTING MACHINES

Filed Feb. 15, 1965   6 Sheets-Sheet 1

INVENTOR.
CORNELIS VAN DER LELY
BY
Mason, Mason & Albright
Attorneys

Oct. 10, 1967 C. VAN DER LELY 3,345,808
HARVESTING MACHINES
Filed Feb. 15, 1965 6 Sheets-Sheet 4

INVENTOR.
CORNELIS VAN DER LELY
BY
Mason, Mason & Albright
Attorneys

Oct. 10, 1967  C. VAN DER LELY  3,345,808
HARVESTING MACHINES

Filed Feb. 15, 1965  6 Sheets-Sheet 6

INVENTOR.
CORNELIS VAN DER LELY
BY
Mason, Mason & Albright
Attorneys

United States Patent Office 3,345,808
Patented Oct. 10, 1967

3,345,808
HARVESTING MACHINES
Cornelis van der Lely, Zug, Switzerland, assignor to Texas Industries Inc., Willemstad, Curacao, Netherlands, Antilles, a limited-liability company of the Netherlands Antilles
Filed Feb. 15, 1965, Ser. No. 432,461
Claims priority, application Netherlands, Feb. 26, 1964, 64—1,807
27 Claims. (Cl. 56—20)

ABSTRACT OF THE DISCLOSURE

A harvester haivng a pair of mowing and crop gathering portions, each of which is maintained, by hydraulic means responsive to the ground surface, at a predetermined distance from the surface of the ground. The portions, which include mowers and reels, are adapted to be folded wherein the blades of one reel are brought between the blades of the other reel. The portions are hinged to move both about axes which are parallel to the normal direction of travel and transverse thereto.

This invention relates to harvesting machines, e.g. combine harvesters, which are of the kind comprising a mowing table or pick-up mechanism or both.

Hitherto difficulty has been encountered by machines of this kind, particularly those having relatively wide mowing tables an/or gathering mechanisms, in adapting themselves to unevennesses in the ground.

In accordance with the invention there is provided a harvesting machine of the kind set forth, wherein the mowing table or pick-up mechanism or both are divided into at least two portions, means being provided for laterally displacing crop towards an outlet opening and at least one portion of a mowing table and/or pick-up mechanism is arranged so as to be turnable with respect to the machine about an axis which is inclined to a horizontal line at a right angle to the intended direction of travel.

For a better understanding of the invention and to show how the same may be readily carried into effect, reference will now be made, by way of example, to the accompanying drawings in which.

Figure 1:
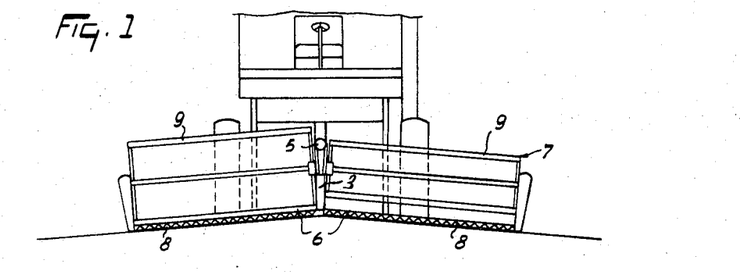
FIGURE 1 is a diagrammatic front view of a harvesting machine in the form of a combine harvester.
Figure 2:
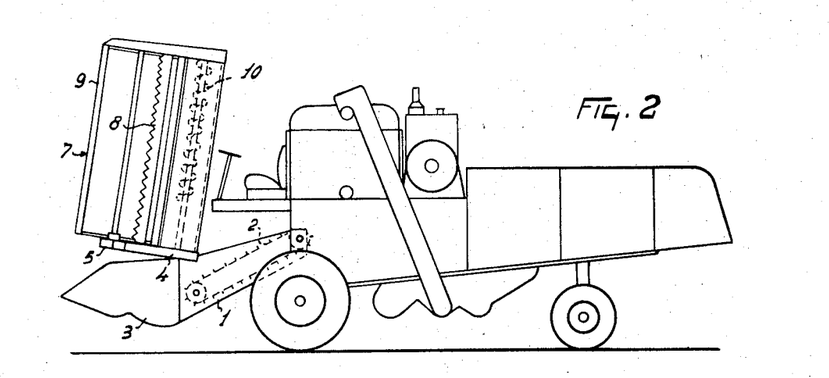
FIGURE 2 is a diagrammatic side view of the combine harvester shown in FIGURE 1 but with parts of the mowing mechanism shown in a transport position.
Figure 3:
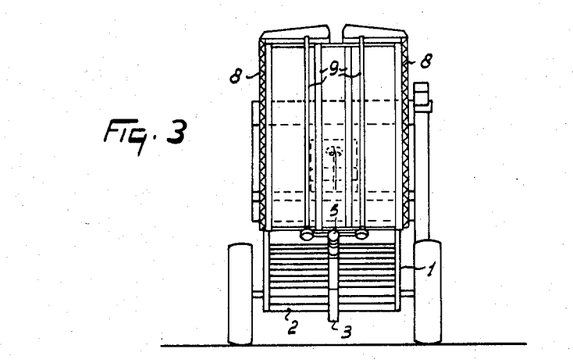
FIGURE 3 is a diagrammatic front view of the combine harvester in a transport position.

Referring now to the first embodiment illustrated in FIGURES 1 to 3, there is shown a combine harvester of the self propelled kind. The combine harvester comprises an elevator housing 1 enclosing an elevator 2 for supplying cut or mown crop to a threshing drum mounted near the center of the combine harvester. A partition 3 is mounted on the forward end of the elevator housing 2 and extends in the intended direction of travel. The partition 3 carries a shaft 4 mounted on its upper side, said shaft 4 extending in the intended direction of travel and a divided sleeve bearing 5 is rotatably mounted on the shaft 4. A mowing table comprises two portions 6 lying one on each side of the partition 3 and each connected to said bearing 5. The portions 6 of the mowing table 7 are symmetrically identical to each other and each supports a corresponding cutter bar 8, reel 9 arranged above said cutter bar and an auger 10 located behind said cutter bar 8. The augers 10 feed crop gathered and cut by the reels 9 and cutter bars 8 respectively through an outlet opening formed in the mowing table 7. The crop passes therefrom to the elevator 2 in the elevator housing 1. The partition 3 divides the mowing table 7 into two parts. The cutter bars 8 and reels 9 are driven by a mechanism (not shown) arranged in the partition 3 and driven by the engine of the combine harvester. The blades of one of the reels 9 are staggered or out of phase with the blades of the other reel when viewed in the direction of the longitudinal axes of the reels.

In the construction described the two portions 6 of the mowing table 7 are thus pivotable relatively to each other about the shaft 4 which is located approximately at the center of the mowing table and extends approximately horizontally forwardly and thus very satisfactory adaptation of the mowing table 7 and also the parts thereof to unevennesses in the ground can be obtained (see FIGURE 1). In this embodiment the cutting width lies between 3 and 6 meters and preferably between 3.6 and 5.4 meters.

Hitherto with known constructions having relatively large widths of the mowing and/or pick-up mechanisms, it has been found difficult to satisfactorily follow unevennesses in the ground which could result in part of the crop not being harvested, for example, when the combine harvester is travelling along a laterally downwardly curving surface. With the construction according to the invention an effective adaptation of the cutting mechanism to the unevennesses can be obtained by turning of the portions 6 about the shaft 4 and hence the cutter bars 8 and reels 9 so that the risk of crop being left unharvested is considerably reduced.

When it is desired to put the combine harvester into a transport position, the portions 6 are turned upwardly about the shaft 4 into a position as shown in FIGURES 2 and 3 wherein they are substantially vertical. The portions 6 are fixed in such a position by means of a locking member which is not shown in the figures. This arrangement is of particular importance in harvesting machines which are equipped with very wide cutting and/or pick-up mechanisms since it is often the case that such machines are not allowed to travel on public roads and it has hitherto been necessary to disengage the entire cutting and/or pick-up mechanisms, and transport them separately.

The elevator housing 2 is turnably mounted on a substantially horizontal shaft extending perpendicular to the intended direction of travel and the housing together with the cutting and gathering mechanisms can be readily raised by any suitable agency such as, for example, a hydraulic lifting cylinder extending between the front axle of the combine harvester and the elevator housing 2. The portions 6 can then be turned upwardly about the shaft 4 and be locked in a vertical position and the combine harvester can then be readily transported along public or other roads since the overall width of the portions 6 is then substantially equal to the width of the combine harvester itself, equal approximately to 2.6 meters.

Figure 4:
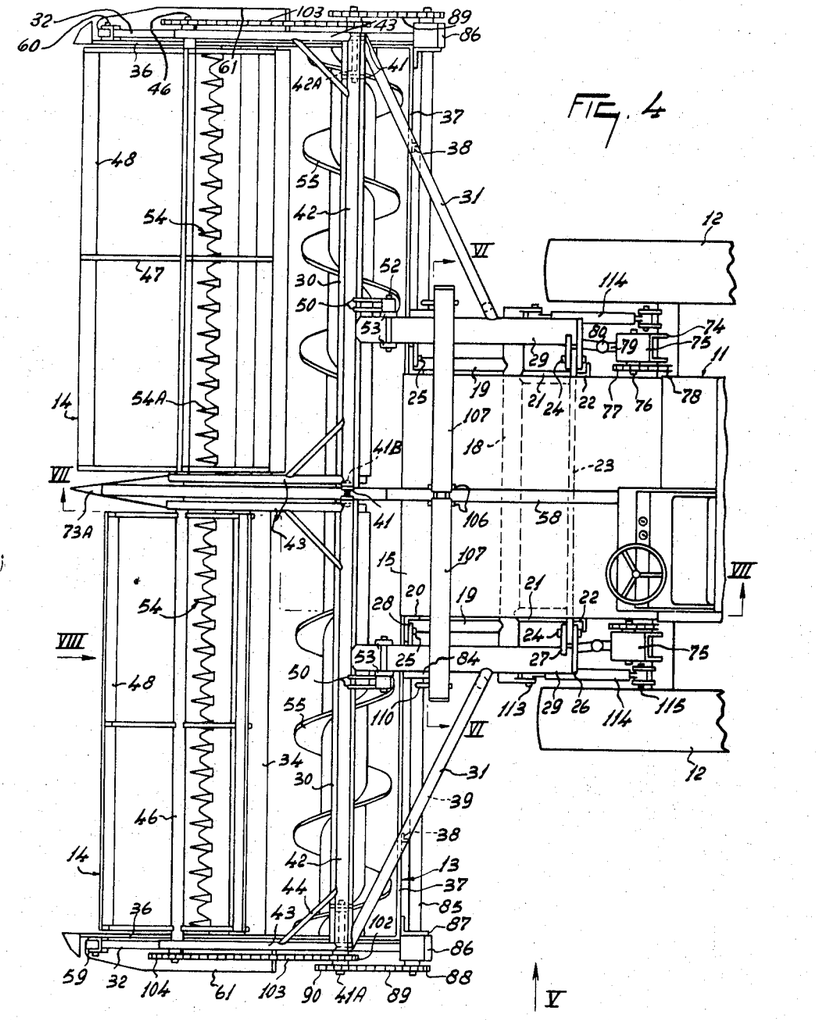
FIGURE 4 is a plan view of a forward portion of a second embodiment of combine harvester.

Referring now to the second embodiment illustrated in FIGURES 4 to 11, the harvester machine comprises a combine harvester, the cutting and elevating portions of which are arranged on the front side of a ground wheel supported frame. However, only the ground wheels 12 are shown. The cutting mechanism comprises a mowing table 13 which has two portions 14 lying along side each other and each connected to a generally cylindrical elevator housing 15. The housing 15 is pivotally connected to the portions 14 and extends upwardly and rearwardly therefrom. The housing 15 is made from sheets of material and forms a central elevator for cut or mown crop. Near the mowing table 13 the housing 15 has an opening communicating with an outlet opening formed in the rear wall of the mowing table 13. The housing 15 tapers rearwardly and thus the inlet diameter is greater than the diameter of the outlet which opens to threshing and cleaning parts of the harvester. The housing 15 encloses an endless conveyor chain 16. The mowing table 13 and the elevator housing 15 are both turnable about a shaft 17 arranged at the upper end of the housing 15 and extending perpendicular to the intended direction of travel. The shaft 17 also constitutes a support for the upper end of the elevator chain 16. A beam 18 is mounted on the underside of the housing 15, is located at a given distance from the forward opening of the housing 15 and extends perpendicular to the intended direction of travel and on either side of the housing 15 and for a given distance beyond same (FIGURE 4).

Beams 19 are connected to the beam 18 and extend forwardly therefrom alongside the outer walls of the elevator housing 15. The forward ends of the beams 19 are secured to angle beams 20 which extend vertically near the forward opening of the elevator housing 15. Upwardly and rearwardly extending beams 21 are also secured to the beam 18 and are disposed substantially parallel to the bottom of the housing 15 approximately beneath the upright side walls thereof. The beams 21 are connected to angle beams 22 through a strip 23 which extends parallel to the beam 18, the angle beams 22 extending vertically one on either side of the elevator housing 15.

The strip 23 carries pins 24, one on either side of the elevator housing 15. The angle beams 20 each carry a pin 25, each of which pins 25 is located forwardly of a corresponding pin 24 and has its axis coincident therewith. Strips 26 and 27 which extend perpendicular to the intended direction of travel are pivotally mounted on the pins 24 and a similarly extending strip 28 is mounted on each pin 25. Each group of strips 26, 27 and 28 on either side of the elevator housing 15 is connected to a corresponding beam 29 which extends in the intended direction of travel and parallel to the elevator housing 15. The forward ends of both the beams 29 are connected to a framed structure 30 which extends perpendicular to the intended direction of travel. The structure 30 comprises parallel beams extending over a distance equal to the width of each portion 14 of the mowing table 13. A beam 31 extends between the outermost end of one of the beams 30 and its corresponding beam 29. The beams 31 are connected to their corresponding beams 29 at the same level as the strips 28. Thus, as can be seen from FIGURE 4, a triangular supporting frame for each portion 14 of the mowing table 13 is provided.

Figure 7:
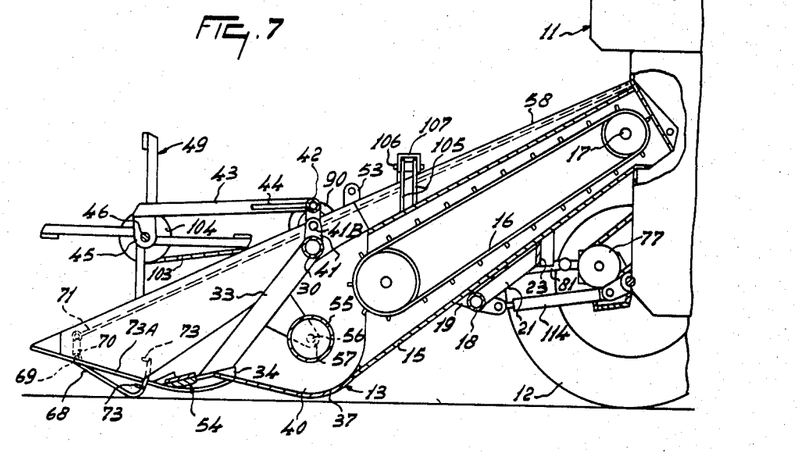
FIGURE 7 is a sectional view taken on the line VII—VII in FIGURE 4.

The beams of the structure 30 for each portion 14 are thus turnably mounted on corresponding pins 24 and 25 which extend in the intended direction of travel through corresponding beams 29. Beams 32 are mounted on the outermost ends of the beams 30, said beams 32 extending forwardly and downwardly therefrom. The adjacent inner ends of the beams 30 are provided with supporting beams 33 which extend forwardly and downwardly therefrom in the intended direction of travel (FIGURE 7).

Figure 5:
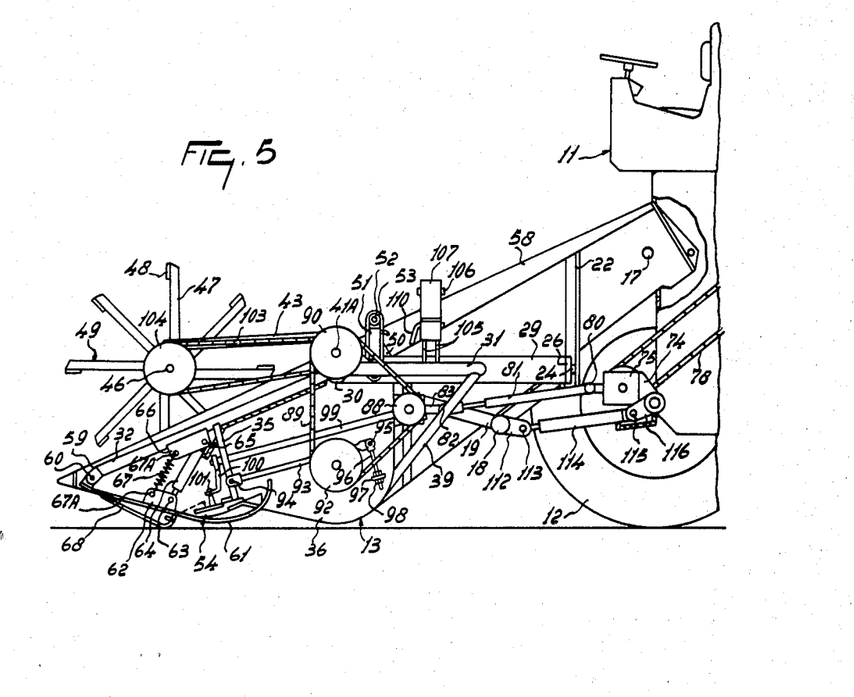
FIGURE 5 is a view taken in the direction of the arrow V in FIGURE 4.

The supporting beams 33 each carry a corresponding horizontal beam 34 near their lower sides, each of which beams 34 extends perpendicular to the intended direction of travel and is connected at its outer end with an angle beam 35 which extends substantially vertically and is connected to the beams 32. Each beam 32 carries a vertical plate 36 which constitutes one of the outer sides of the mowing table 13. The beams 32 and 35 are located on the outer side of their corresponding plates 36 (FIGURE 5). A base plate 37 is arranged on the beam 34 and extends rearwardly therefrom in a substantially horizontal direction and merges into an upwardly bent portion. Each portion 14 of the mowing table 13 has corresponding a beam 34 and base plates 37. The plate 37 forms the base and the rear wall of its corresponding portion 14 and has its upper side bent over at right angles and coupled with an angle beam 38 which extends downwardly away from a corresponding beam 31. The lower end of each angle beam 38 is coupled with a corresponding beam 31 through an upwardly and rearwardly extending beam 39. The beam 39 is connected to its corresponding beam 31 near the point where the beam 31 is connected to its corresponding beam 29. Each plate 37 is secured to a corresponding plate 36 forming one of the outer walls of the mowing table 13 and the bent over portion of each plate 37 is prolonged to meet a side wall of the elevator housing 15. The supporting beams 33 which are arranged near the adjacent ends of the structure 30, carry vertical plates 40 which constitute the inner walls of the portions 14 of the mowing table 13, the plates 40 being secured at their lower edges to the horizontal portions of the plates 27. The ends of the frame beams 30 carry lugs 41 which are formed with holes and receive shafts 41A and 41B. The shafts 41A and 41B extend parallel to the frame beams 30 and are surrounded by lugs 42A which are secured near the ends of beams 42 also parallel to the beams 30. The beams 42 are provided near their outer ends with beams 43 which extend perpendicular thereto and in the direction of travel. The junctions between the beams 42 and 43 is stiffened by means of supports 44.

The beams 43 carry bearings 45 near their free forward ends, said bearings 45 receiving shafts 46 which extend perpendicular to the intended direction of travel and parallel to the beams 42. The shafts 46 carry radial supports 47 near their ends and also between same and struts 48 extend between the tips of the supports 47. The struts 48 may, if desired, carry tines. The supports 47 and struts 48 constitute reels 49 located above the portions 14 of the mowing table 13. The beams 42 carry pairs of lugs 50 near their corresponding beams 29, said lugs 50 extending downwardly and rearwardly from the beams 42. Each pair of lugs 50 is pivotally connected to a corresponding substantially vertically disposed lifting cylinder 51 which is located on the side of the beam 42 remote from its corresponding reel 49. The end of each cylinder 51 remote from its corresponding pair of lugs 50 is pivotally connected to the corresponding beam 29 by means of a pin 52. Each pin 52 is supported between two strips 53 which are mounted on the upper side of the corresponding beam 29 and are spaced apart from each other.

The horizontal beams 34 which extend perpendicular to the intended direction of travel and are located on the lower side of the mowing table 13 carry at their forward ends finger bars 54A forming part of cutter bars 54. Each portion 14 of the mowing table 13 is similarly constructed and accordingly will only be described in respect of one of them. An auger 55 is mounted on a shaft 56 which extends perpendicular to the intended direction of travel and is rotatably mounted in a bearing 57 arranged on the supporting beam 33 and in a bearing (not shown) arranged on the plate 36 which constitutes one of the outer walls of the mowing table 13.

A partition 58 is mounted on the upper side of the elevator housing 15 and at the center thereof, said partition 58 diverging forwardly (FIGURES 5 and 7). Referring to FIGURE 4, it will be evident that the partition 58 at its front end constitutes a crop divider. However, the partition 58 also constitutes a partition between the two portions 14 of the mowing table 13, said partition being located near the center of the combine harvester.

The front ends of the beams 32 carry forks 59, which forks 59 carry shoes 61 on pins 60 arranged between the limbs of the forks. The shoes 61 extend rearwardly from the forks 59 and comprise supporting members whose free rearmost ends are bent upwardly (FIGURE 5). Approximately mid-way between its ends, each shoe 61 carries a plate 62 on its upper side and a corresponding lifting cylinder 64 is pivotally connected to each plate 62 by means of a pin 63. The other ends of the cylinders 64 are pivotally connected to plates 66 mounted on the lower sides of the beams 32 by means of pins 65. Tension springs 67 extend between the plates 62 and 66, are parallel to the lifting cylinders 64 and are connected forwardly of the lifting cylinders. The connections between the springs 67 and the plates 66 are afforded by means of pins 67A. A feeler member 68 is secured to a pivot pin 69 which is mounted to the forward end of the partition 58, the feeler member 68 extending rearwardly of the pin 69 which has an upright arm 70 secured thereto.

Figures 9, 10:
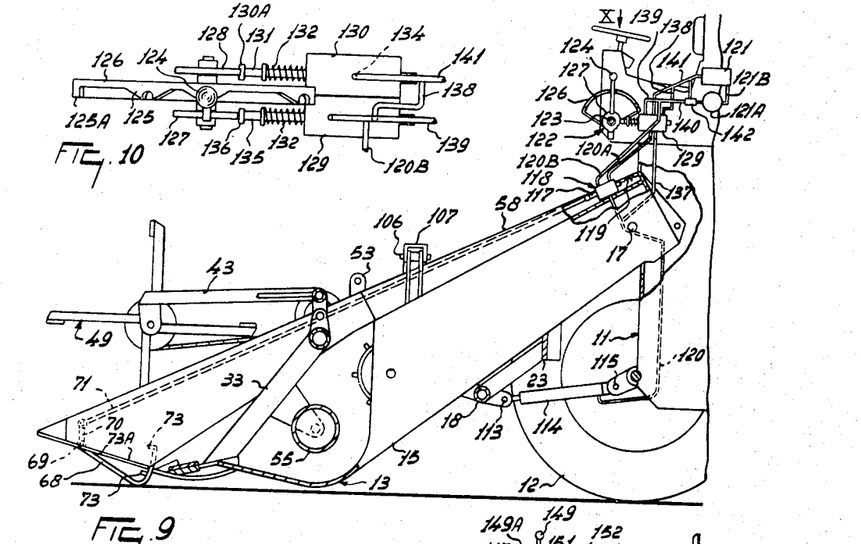
FIGURE 9 is a diagrammatic view of part of the hydraulic circuit including a regulating mechanism and control members for adjusting the position of the mowing mechanism.
FIGURE 10 is a scrap view, to an enlarged scale, taken in the direction of the arrow X in FIGURE 9.

The arm 70 is pivotally connected to a rod 71 which has its rearmost end connected to a control valve mounted on the frame of the combine harvester (FIGURE 9). The construction and operation of the hydraulic circuit of the combine harvester will be more fully described later. The free rearmost end of the feeler member 68 is bent upwardly, said free end being provided with spaced stops 73 which can co-operate with a stop formed by a part 73A of the partition 58. The part 73A serves to limit the up and down movement of the feeler member 68. The working mechanisms associated with each portion 14 of the mowing table 13, that is the cutter bar 54, the auger 55 and the reel 49, are adapted to be driven individually by means of a gear box 75 mounted on the axle of the ground wheels 12 through supports 74 (FIGURE 4). Each gear box 75 receives a shaft 76 extending perpendicular to the intended direction of travel and sprockets are mounted on both said shafts 76 on the outer side of the gear boxes 75. Chains 78 drivingly connect the sprockets 77 with sprockets which are driven by the engine of the combine harvester. Each shaft 76 inside its corresponding gear box 75 carries a bevel gear (not shown) which is in meshing engagement with a bevel gear (not shown) mounted on a shaft 79 which extends in the travelling direction and is coupled through a universal joint 80 with a telescopic intermediate shaft 81. The end of each shaft 81 remote from its corresponding universal joint 80 is linked to a shaft 83 through a universal joint 82, the joint 83 being provided with a bevel gear (not shown) in a gear box 84 mounted on the vertical plate 36 which forms the rear wall of the corresponding portion 14.

The bevel gear in each gear box 84 is adapted to co-operate with a bevel gear (not shown) secured to the shaft 85 which extends perpendicular to the intended direction of travel and on the rear of the corresponding portion 14, and the outer end of the shaft 85 is received in a gear box 86. Both the gear boxes 86 are secured to their corresponding portions 14 at the level of the adjacent end of one of the beams 30 by means of supports 87. Each shaft projects outwardly beyond its gear box 86 and carries a sprocket 88 on the projecting end, each of which sprockets 88 is linked to a sprocket 90 mounted on a corresponding shaft 41A by a chain 89. Each sprocket 90 is linked to a sprocket 92 mounted on the corresponding shaft 56 for one of the augers 55 (FIGURE 5).

Each of the bearings (not shown) which is mounted in a corresponding plate 36 for supporting the corresponding shaft 56 of an auger 55 is so arranged that it can be displaced with respect to its plate 36 in order to tension the chain 89 and also to adjust the position of the auger 55. To this end each bearing is coupled with a rod 93 which has its forward end pivotally connected to one of the beams 35 by means of a pin 94, which beam 35 is arranged between the beams 32 and 34 and is located along the side of the plate 36. The rearmost end of each rod is pivotally connected to an upright rod 96 by means of a pin 95, the rod 96 being slidably arranged in a support 97 secured to the corresponding plate 36. The lower free ends of the rods 96 are screwthreaded and nuts 98 are screwed onto said ends. Each shaft 56 can be displaced by turning one of the nuts 98 which causes the corresponding rod 96 to move upwardly or downwardly relative to its support 97 thereby also displacing the rod 93 and hence the shaft 56 so that the tension in the chain 89 can be varied and the position of the auger 55 altered.

Each gear box 86 receives a driving shaft 99 which extends forwardly and gently downwardly therefrom. The forward end of each shaft 99 has an angle lever 100 pivotally and eccentrically coupled thereto, which lever 100 is coupled with the sickle bar of the corresponding cutter bar 54 through a ball and socket joint 101. Each shaft 41A also carries a sprocket 102 which is linked to a sprocket 104 mounted on the shaft 46 on the corresponding reel 49 through a chain 103.

Figure 6:
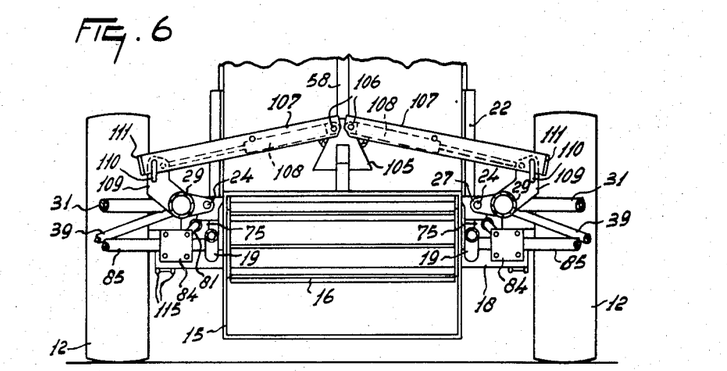
FIGURE 6 is a sectional view taken on the line VI—VI in FIGURE 4.

Referring to FIG. 4 it will be evident that the drive mechanism for the cutter bars, reels and augers are arranged on the outer sides of the mowing table. Thus the space between the portions 14 can be a minimum distance while repair works and other adjustments can still be effected. A triangular support 105 is secured to the partition 58, said support extending perpendicular to the intended direction of travel (FIGURE 6). The support 105 carries two pivot pins 106 which are mounted near its uppermost end and each pin 106 is connected to a corresponding channel beam 107 which extends outwardly therefrom in a direction perpendicular to the intended direction of travel. The pins 106 are entered through holes formed in the parallel limbs of the channels and the webs thereof are disposed uppermost. Each beam 107 receives a lifting cylinder 108 which has one end pivotally connected to one of the pins 106 and its other end pivotally connected to an angle arm 109. Each arm 109 is secured to a corresponding beam 29. Operation of one of the cylinders 108 causes the portion 14 concerned to turn upwardly or downwardly about its corresponding pins 24 and 25 which are arranged on its side of the elevator housing 15.

Figure 8:
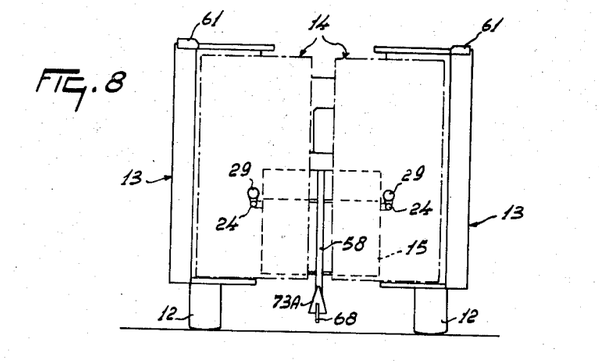
FIGURE 8 is a diagrammatic front view of the second embodiment of combine harvester in a transport position.

When the portions 14 are turned upwardly about the pins 24 and 25, they occupy the positions shown in FIGURE 8 in which they are substantially vertically disposed. In order to fix the portions 14 in this position, pins 110 are entered through aligned holes formed in the arms 109 and the beams 107. However, the portions 14 can also be locked in a substantially horizontal setting by entering the pins 110 through other aligned holes in the arms 109 and the beams 107. Referring to FIGURE 6 it will be evident that the channel beams 107 have their outer ends closed by plates 111 which constitute stops for the arms 109 when in an unlocked state and hence further downward movement of the portions 14 about the pins 24 and 25 is prevented.

The beam 18 which extends perpendicularly to the intended direction of travel and is located beneath the elevator housing 15, carries pairs of lugs 112, one pair of lugs being located on each opposite side of the housing 115. Hydraulic cylinders 114 are pivotally mounted between the pairs of lugs 112 by means of pins 113 and the other ends of the cylinders 114 are pivotally connected between pairs of lugs 116 fixed to the axles of the ground wheels 12 (FIGURES 5 and 7). The elevator housing 15 together with the mowing table 13 can both be raised and lowered by the hydraulic cylinders 114 which are disposed parallel to each other.

The operation of the various hydraulic systems will now be described more fully with reference to FIGURES 9 to 11. As previously described the feeler member 68 is linked to a rod 71 which extends upwardly and parallel to the longitudinal axis of the partition 58. The rearmost end of the rod 71 is pivotally connected to a sliding rod 117 received in a valve 118 (see FIG. 12) which is mounted on the upper side of the elevator housing 15. The end of the sliding rod 117 remote from the rod 71 is coupled to the frame of the combine harvester by means of a tension spring 119. The valve 118 communicates with both the cylinders 114 by way of pipes 20.

Figure 13:
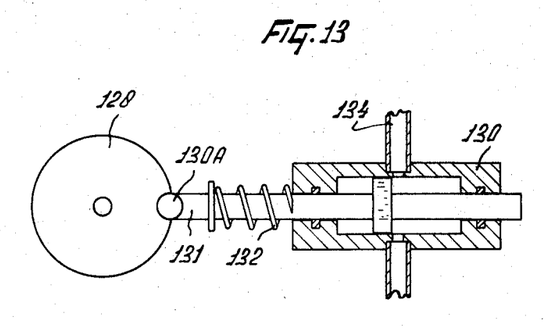
FIGURE 13 is a sectional view of a control valve of the hydraulic circuit.

In addition the valve 118 communicates with a reservoir 121 and pump 121A by way of pipes 120A and 120B respectively. The reservoir 121 and pump 121A form part of the hydraulic circuit provided on the combine harvester and are connected to each other by a pipe 121B. An adjusting mechanism generally indicated by the reference numeral 122 is mounted near the driver's seat on the combine harvester, the mechanism comprising a lever 124 turnably mounted on a pin 123 and movable into various angular settings indicated by elements 125 and 125A on a sector plate 126 (FIGURE 10). Two adjacent cam discs 127 and 128 are mounted on the pin 123 and are adapted to co-operate with a valve 129 identical to the valve 118 and a control valve 130 (see FIG. 13) respectively.

The normal positions of the cam discs 127 and 128 and of the valves 129 and 130 are as shown in FIGURE 10. The cam 128 is formed with a recess which accommodates a roller 130A mounted on the end of a sliding rod 131 received in the control valve 130. A spring 132 surrounds the sliding rod 131 and bears between an end of the housing of the valve 130 and a stop mounted on the sliding rod 131. The spring 132 serves to hold the roller 130A in engagement with the recess formed in the cam 128. The control valve 130 communicates with the valve 118 through the pipe 120A and with the reservoir 121 through the pipe 120A and with the reservoir 121 through a pipe 134.

The cam disc 127 in similar manner co-operates with a roller 136 provided on one end of a sliding rod 135 received in the valve 129. Also a spring 132 bears between the housing of the valve 129 and a stop mounted on the sliding rod 135 and serves to hold the roller 126 in engagement with the recess in the cam 127. The valve 129 communicates with the hydraulic cylinders 114 through pipes 137 and communicates with the reservoir 121 and the pump 121A by way of pipes 138 and 139 respectively. Referring to FIGURE 9 it will be seen that a high pressure main pipe 140 of the pump 121A and a main pipe 141 leading to the reservoir 121 are provided with a known type of backing-off valve 142 which is not described herein. The backing-off valve 142 ensures that a given constant hydraulic pressure is maintained in the circuit without the need for the pump 121A to be operated constantly. Any desired hydraulic pressure can be obtained by means of the backing-off valve 142.

Figure 11:
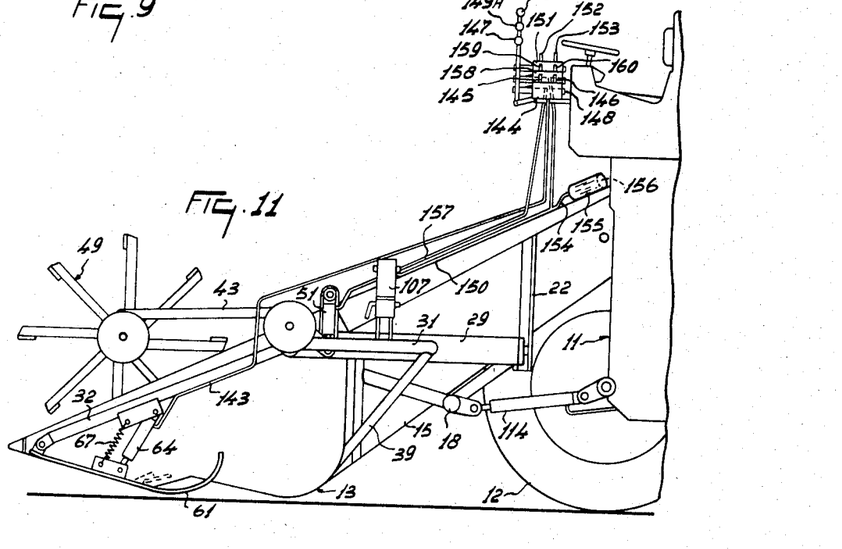
FIGURE 11 is a diagrammatic view of the hydraulic control of a support for the mowing mechanism and the hydraulic vertical adjustments of the reel.
Figure 12:
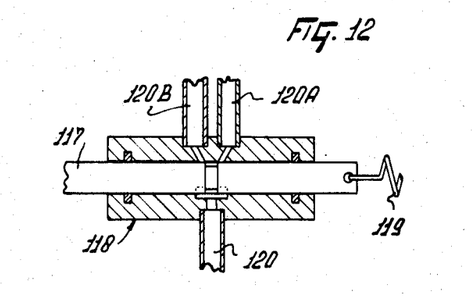
FIGURE 12 is a sectional view of a valve of the hydraulic circuit.

Referring now to FIGURE 11, it will be seen that the hydraulic cylinders 64 which are provided for the height adjustment of the shoes 61 communicate with a valve 144 identical to the valve 118 and mounted near the driver's seat by way of pipes 143. The valve 144 communicates with the main pipes 141 and 140 by way of pipes 145 and 146 respectively. The valve 144 is controlled by means of a lever 147 which is adapted to co-operate with a sliding rod 148 received within the valve 144.

The lifting cylinders 108 which are provided for raising and lowering the portions 14 of the mowing table 13, communicate with a valve 151 by way of pipes 150. The valve 151 is identical to the valve 144 and communicates with the main pipes 141 and 140 by way of pipes 152 and 153 respectively. Each pipe 150 communicates with a reservoir 155 by way of a pipe 154, each reservoir 155 being made of a flexible material and containing a gas bubble 156, preferably nitrogen, which bubble 156 is compressed by the liquid of the hydraulic circuit. The flexible reservoirs 155 containing gas together with the hydraulic circuit in communication therewith thus constitute hydro pneumatic means.

It has already been stated that the reels 49 are upwardly and downwardly adjustable by means of the hydraulic cylinders 51. Each cylinder 51 communicates with a valve 158 by way of a pipe 157, the valve 158 being identical to the valves 144 and 151 and communicating with the main pipes 141 and 140 by way of pipes 159 and 160 respectively. All the valves 144, 151 and 158 are arranged on the combine harvester near the driver's seat.

The various hydraulic members described above and their control member operate as follows. In the position of the lever 124 shown in FIGURE 9 the mowing table 13 occupies a position in which the feeler member 68 is in contact with the ground during operation of the combine harvester. The sliding rod 135 of the valve 129 is so positioned in this case by the cam disc 127 that liquid is unable to flow through the pipes 137 to the lifting cylinders 114.

The sliding rod 131 received in the control valve 130 is held in such a position for the given position of the lever 124 shown in FIGURE 9 that the valve is open. Thus the valve 118 which is coupled with the feeler member 68 communicates with both the main pipes 140 and 141. When the feeler member 68 encounters a bump or other upward unevenness, it is turned upwardly about the pin 69 and hence the sliding rod 117 in the valve 118 is withdrawn therefrom so that the main pipe 140 containing the high pressure liquid comes into communication with the pipes 120 which lead to the lifting cylinders 114, so that the mowing table 13 is raised. When the bump or unevenness has been passed the feeler member 68 turns downwardly about the pin 69 and this in conjunction with the action of the spring 119 allows the main pipe 141 to communicate with the pipes 120 whereby high pressure liquid can flow from the cylinders 114 to the reservoir 121 until the mowing table 13 regains its original position.

When the lever 124 is moved to the left-hand side of the sector plate 126, the sliding rod 131 is displaced by the cam disc 128 so that the control valve 130 is closed and the feeler member 68 cannot control the lifting cylinders 114.

When the lever 124 is moved to the left the sliding rod 135 is displaced by the cam disc 127 so that the main pipe 140 comes into communication with the pipe 137 and thence to the lifting cylinders 114 which thus raise the elevator housing 15 and platform 13.

From FIGURES 9 and 10, it will be seen that the lever 124 may occupy a central position (alongside the element 125) in which the sliding rod 135 is held by the cam disc 127 in such a position that connection between the main pipe 140 and the pipes 137 is interrupted and hence the mowing table 13 remains in a given position. When the lever 124 is moved from its central position (alongside the element 125) either to the left or to the right, the sliding rod 135 in valve 129 is moved in such a position that the main pipe 140 comes into communication with the pipe 137 and the mowing table 13 can be raised. Hereby the mowing table 13 and the elevator housing 15 are moved upwardly by the lifting cylinders 114 by turning about the shaft 17.

The lever 147 controls the valve 144 through the sliding rod 148 in order to displace the lifting cylinders 64 which are coupled with the shoes 61. The valve 151 is controlled by the lever 149 acting through its sliding rod 148 so that liquid can flow to the lifting cylinders 108 and hence the portions 14 of the mowing table 13 can be raised and lowered by means of the arms 109 turning the beams 29 about the pins 24 and 25. When the combine harvester is in normal operation the portions 14 bear on the ground through the shoes 61. The lifting cylinders 108 are in communication with the reservoirs 155 containing the gas bubbles 156 and hence resilient support for the portions 14 is obtained and the pressure of the shoes 61 on the ground is materially reduced and smooth adaptation of the portions 14 to unevennesses in the ground is ensured. The positions of the reels 49 can be adjusted on actuation of the valve 158 by the lever 149A whereby high pressure liquid can flow to or from the lifting cylinders 51 and hence alter the position of the reels 49.

The combine harvester which has been described may be employed in various ways. When it is desired to cut low lying crop, for example, crop which has been blown down by the wind, hail or the like, it is necessary that the mowing beams 54 be moved only a few centimeters above the ground and in this case the locking of the two portions 14 to the frame of the combine harvester can be disengaged by removing the pins 110 so that each portion 14 can pivot about its own axis afforded by the pins 24 and 25 which lie on one side of the elevator housing 15. In this manner the portions 14 can match or adapt themselves to any unevennesses in the ground. The portions 14 of the mowing table engage the ground with their shoes 61. Both the shoes 61 are adjustable in common to the same height by means of the valve 144 and the lifting cylinders 64. The feeler member 68 which is disposed near the centre of the machine near the partition 58 between the two portions 14 can be rendered operative by means of the lever 124. Actuation of the valve 118 by the feeler 68 can then cause liquid to flow to or from the lifting cylinders 114. In addition to slight amount of liquid can be supplied to the lifting cylinders 108 for the portions 14 by means of the valve 151 so that the gas bubbles 156 in the flexible containers 155 have a cushioning effect and the pressure with which each of the portions 14 bears on the ground through the shoes 61 can be considerably reduced and hence the portions 14 thus follow the ground surface more accurately and the mowing mechanism have optimum effect. When the driver of the combine harvester reaches the end of a strip of crop or an edge of the field, the mowing table 13 may be raised by actuation of the lever 124 and hence the lifting cylinders 114, and since the portions 14 are in the unlocked position, the arms 109 will turn relatively to their channel beams 107 until they abut agains the plates 111. In this position the portions 14 are inclined downwardly at an angle of about 5° to the horizontal. When it is desired to mow at a distance of about 25 centimeters above the ground, the mowing table 13 is moved to said height by operation of the lifting cylinders 64 and hence lowering of the shoes 61 and the feeler member 68 is held by one of the stops 73. As previously described, the pressure of the shoes on the ground can be reduced by means of the gas cushion effect. The two portions 14 are again in the unlocked state and can thus follow unevenesses in the ground since they are capable of deflecting resiliently about the pins 24 and 25. When it is desired to mow at a height of more than 25 centimeters above the ground, the shoes 61 are also out of contact with the ground and if mowing is performed at 30 centimeters or more above the ground, then the two portions 14 of the mowing table 13 are locked in the horizontal position by means of the locking pins 110 (FIGURE 6). The whole mowing platform comprising the portions 14 thus has its entire weight carried by the driving wheels 12 and the mowing platform 13 comprises a single unit.

When it is desired to move the combine harvester into a transport position, the elevator housing 15 together with the mowing table 13 is raised when the lever 124 is operated, and on removal of the locking pins 110, each of the portions 14 can be turned upwardly about their pins 24 and 25 on actuation of the valve 151 and the lifting cylinders 108. The portions 14 are then substantially vertically disposed.

Thus a combined harvester having a relatively large cutting width, for example, 6 meters, can be readily converted into a transport position in which it can be readily moved from one place to another. In the particular embodiment described it is not necessary to raise the mowing table very much above the ground owing to the particular disposition of the pins 24 and 25. Each pair of pins 24 and 25 is located inwardly of the outward end of its corresponding portion 14 by a distance which is approximately equal to two thirds of the width of each portion 14. Owing to this disposition of the pins 24 and 25, the portions 14 of the mowing table can readily match or adapt themselves to unevennesses in the ground surface and the portions 14 are effectively supported by means of the triangular frames formed by the beams 29, 30 and 31 so that the portions 14 cannot be displaced in a direction parallel to the longitudinal axis of the combine harvester to any appreciable extent.

From FIGURES 4 and 5 it will be seen that the elevator housing 15 which is a cylindrical shape, is of particularly rugged construction and is effectively supported on all sides so that torsional forces can be readily opposed and absorbed. The partition 58 also serves to strengthen the construction of the elevator housing 15.

The front end of the partition 58 serves as a crop divider so that the stems of the crop are deflected outwardly towards the portions 14 and can be readily engaged by the reels 49 above each mowing beam 54. Also the supporting beams 33 for the cutter bars 54 and the augers 55 are located, during operation, behind the partition 58 so that the beams 33 do not obstruct the delivery of crop to the reels 49 and mowing beams 54. Satisfactory delivery of mown or cut crop to the elevator housing 15 is also ensured by the fact that supporting beams 23 extend obliquely forwardly and hence keep the foremost opening of the elevator housing clear.

It will be evident that the above described constructions are not restricted to the mowing and/or pick-up mechanisms of combine harvesters and that they can be employed equally successfully for the mowing and/or pick-up mechanisms of the other harvesting machines comprising members for processing mown or cut crop, for example, forage harvesters and pick-up balers. Also the gas cushion effects for reducing the weight of the pivotable portions may be substituted by other means, such as, for example, springs.

For the purposes of the invention as claimed the terms "forward" and "rear" are used with reference to the intended direction of operative travel.

Having thus described my invention, what I claim as new and desire to secure by Letters Patent of the United States is:

1. A harvesting machine having a mowing table divided into at least two portions, an outlet in said table, at least one portion being pivotable about a substantially horizontal axis extending in the general direction of travel of the harvester, a hydraulic circuit including hydropneumatic cushion support means for moving each of said portions, a partition located near the center of said mowing table, said partition being a crop divider, wherein the bottom side of the partition is provided with a feeler member, said feeler member being hydraulically associated with an adjusting mechanism for the automatic adaptation of the portions located on each side of the partition to the unevennesses of the ground surface.

2. A harvesting machine as claimed in claim 1 wherein the feeler member extends rearwardly away from a pivotal mounting on the partition.

3. A harvesting machine as claimed in claim 1 wherein the feeler member is provided with two spaced stops near its free end which stops are adapted to cooperate with a part of the partition located between the stops.

4. A harvesting machine as claimed in claim 1 wherein each of the portions is provided with a lifting cylinder for its upward and downward displacement, said lifting cylinders being adapted to be actuated by means of the adjusting mechanism which is associated with the feeler member.

5. A harvesting machine as claimed in claim 1 wherein the hydraulic circuit includes, on the machine, a regulating mechanism by means of which the feeler member can be rendered ineffective, said regulating mechanism being constructed whereby after the feeler member is put out of operation, the regulating mechanism can be used for varying the height of the mowing table.

6. A harvesting machine as claimed in claim 5 wherein the hydraulic circuit includes a control valve for interrupting the circuit between the feeler member and the adjusting mechanism.

7. A combine harvester having a mowing table divided in at least two portions, each of said portions comprising its own cutting mechanism, an outlet opening in said table, means for laterally displacing crop towards said opening, at least one portion being turnable about a substantially horizontal axis extending in the general direction of travel, each portion of the mowing table being provided with a rotatable reel, one of said reels being mounted over said table in said one portion to be turnable therewith, the reels of the portions being arranged with respect to each other whereby, viewed in the direction of the axis of rotation of said reels, a blade of one reel is between two blades of the other reel.

8. A harvester as claimed in claim 7, wherein a partition is arranged between the portions of the mowing table, said partition extending forwardly beyond the mowing table, the forward part of the said partition being formed as a crop divider.

9. A harvester as claimed in claim 8, wherein the partition includes drive means for said reels and cutting mechanism on the mowing table.

10. A harvester as claimed in claim 8, wherein the partition between the two portions is located proximate to the outlet opening.

11. A harvester as claimed in claim 8, wherein the bottom side of said partition is provided with a feeler member, said feeler member being hydraulically associated with an adjusting mechanism for the automatic adaptation of the portions located on each side of the partition to unevennesses in the ground surface.

12. A harvester as claimed in claim 11, wherein said feeler member is pivotally mounted on said portion and extends rearwardly away from its pivotal mounting.

13. A harvester as claimed in claim 11, wherein said feeler member is provided with two spaced stops near its free end which stops are adapted to co-operate with a part of the partition located between the stops.

14. A harvester as claimed in claim 11, wherein each of said portions is provided with a lifting cylinder for its upward and downward displacement, said lifting cylinders being adapted to be actuated by means of said adjusting mechanism associated with said feeler member.

15. A harvester as claimed in claim 11, wherein the hydraulic circuit includes a regulating mechanism by means of which said feeler member can be rendered ineffective, said regulating mechanism being constructed whereby after said feeler member is put out of operation, the regulating mechanism can be used for varying the height of the mowing table.

16. A harvester as claimed in claim 15, wherein the hydraulic circuit includes a control valve for interrupting the circuit between said feeler member and said adjusting member.

17. A harvester as claimed in claim 7, wherein said outlet opening is located at the approximate center of said table, said portions being pivotable about pins located one on each side of the said outlet opening.

18. A harvester as claimed in claim 7, wherein stop means are provided for limiting turning movement of the portions in at least one direction.

19. A harvester as claimed in claim 18, comprising a frame, a support being provided for each of said portions, said supports being connected to said stop means and extending transversely of the direction of travel of the harvester, each support being connected to an arm forming part of said stop means and pivotally connected to said frame near the center thereof.

20. A harvester as claimed in claim 19 wherein each of said arms can be fixed in at least two different positions relative to its support.

21. A harvester as claimed in claim 19, wherein each support is a channel-section beam having downwardly disposed limbs and each arm is associated with a corresponding portion of the mowing table, said arm being movable between the downwardly disposed limbs of the channel-section beam.

22. A harvester as claimed in claim 7, having a hydraulic circuit including hydropneumatic cushion support means for resiliently supporting each of said portions.

23. A harvester as claimed in claim 22, wherein the hydropneumatic means comprises a gas container in communication with the hydraulic circuit.

24. A harvester as claimed in claim 22, wherein the hydraulic circuit includes a lifting cylinder for each portion, whereby said portions are pivotable into a transport position.

25. A harvester as claimed in claim 7, comprising drive means included for each portion of said mowing table, elevator means including a housing for receiving cup crop from said table by means of said outlet opening, said drive means including a shaft extending in the same general direction as said housing, a driving shaft extending transversely to the direction of travel of the harvester, said shaft being coupled with said driving shaft.

26. A harvester as claimed in claim 7, wherein at least one of said portions is supported by a vertically adjustable member by means of which said mowing table follows the contour of the ground.

27. A harvester as claimed in claim 26, wherein said supporting member is located near the forward end of said mowing table and is upwardly and downwardly adjustable by means of a hydraulic cylinder.

References Cited
UNITED STATES PATENTS

| | | | |
|---|---|---|---|
| 1,073,819 | 9/1913 | Rice | 56—21 |
| 1,724,300 | 8/1929 | Moncreiffe | 56—21 |
| 2,224,970 | 12/1940 | Lindgren et al. | 56—20 |
| 2,292,958 | 8/1942 | Millard et al. | 56—21 |
| 3,070,938 | 1/1963 | Winget | 56—6 |
| 3,115,738 | 12/1963 | Engler | 56—6 |
| 3,258,901 | 7/1966 | Van der Lely et al. | 56—20 |

ABRAHAM G. STONE, *Primary Examiner.*

ANTONIO F. GUIDA, *Examiner.*